United States Patent [19]

Maher, III

[11] Patent Number: 5,144,570

[45] Date of Patent: * Sep. 1, 1992

[54] NORMALIZATION ESTIMATOR

[75] Inventor: Robert D. Maher, III, Carrollton, Tex.

[73] Assignee: Cyrix Corporation, Richardson, Tex.

[*] Notice: The portion of the term of this patent subsequent to Aug. 13, 2008 has been disclaimed.

[21] Appl. No.: 716,560

[22] Filed: Jun. 17, 1991

Related U.S. Application Data

[62] Division of Ser. No. 388,659, Aug. 2, 1989, Pat. No. 5,040,138.

[51] Int. Cl.⁵ ................................. G06F 7/38
[52] U.S. Cl. .............................. 364/715.04; 364/746.2; 364/748
[58] Field of Search ............ 364/715.04, 715.01, 364/746.2, 748

[56] References Cited

U.S. PATENT DOCUMENTS

| | | | |
|---|---|---|---|
| 3,928,857 | 12/1975 | Carter et al. | 340/172.5 |
| 4,475,173 | 10/1984 | Talmi | 364/715 |
| 4,528,640 | 7/1985 | Criswell | 364/737 |
| 4,586,154 | 4/1986 | Berry | 364/748 |
| 4,748,575 | 5/1988 | Ashkin et al. | 364/715 |
| 4,758,974 | 7/1988 | Fields et al. | 364/748 |
| 4,779,220 | 10/1988 | Nukiyama | 364/748 |
| 4,782,457 | 11/1988 | Cline | 364/715.04 |
| 4,785,421 | 11/1988 | Takahashi et al. | 364/715.04 |
| 4,794,557 | 12/1988 | Yoshida et al. | 364/748 |
| 4,878,190 | 10/1989 | Darley et al. | 364/752 |
| 4,922,446 | 5/1990 | Zurawski et al. | 364/715.04 |
| 5,040,138 | 8/1991 | Maher, III | 364/748 |

Primary Examiner—Long T. Nguyen
Attorney, Agent, or Firm—Baker & Botts

[57] ABSTRACT

A normalization circuit (24) which comprises a signed digit subtracter (25) coupled to operand registers (14, 19). The signed digit subtracter (25) subtracts the operands and inputs a signed digit difference to a pseudovalue converter (27). The pseudovalue converter (27) generates a pseudovalue in non-redundant format which contains its most significant non-zero bit in the selected bit position. The pseudovalue is output to a leading zero counter (28) which counts the number of leading zeroes in the pseudovalue.

11 Claims, 1 Drawing Sheet

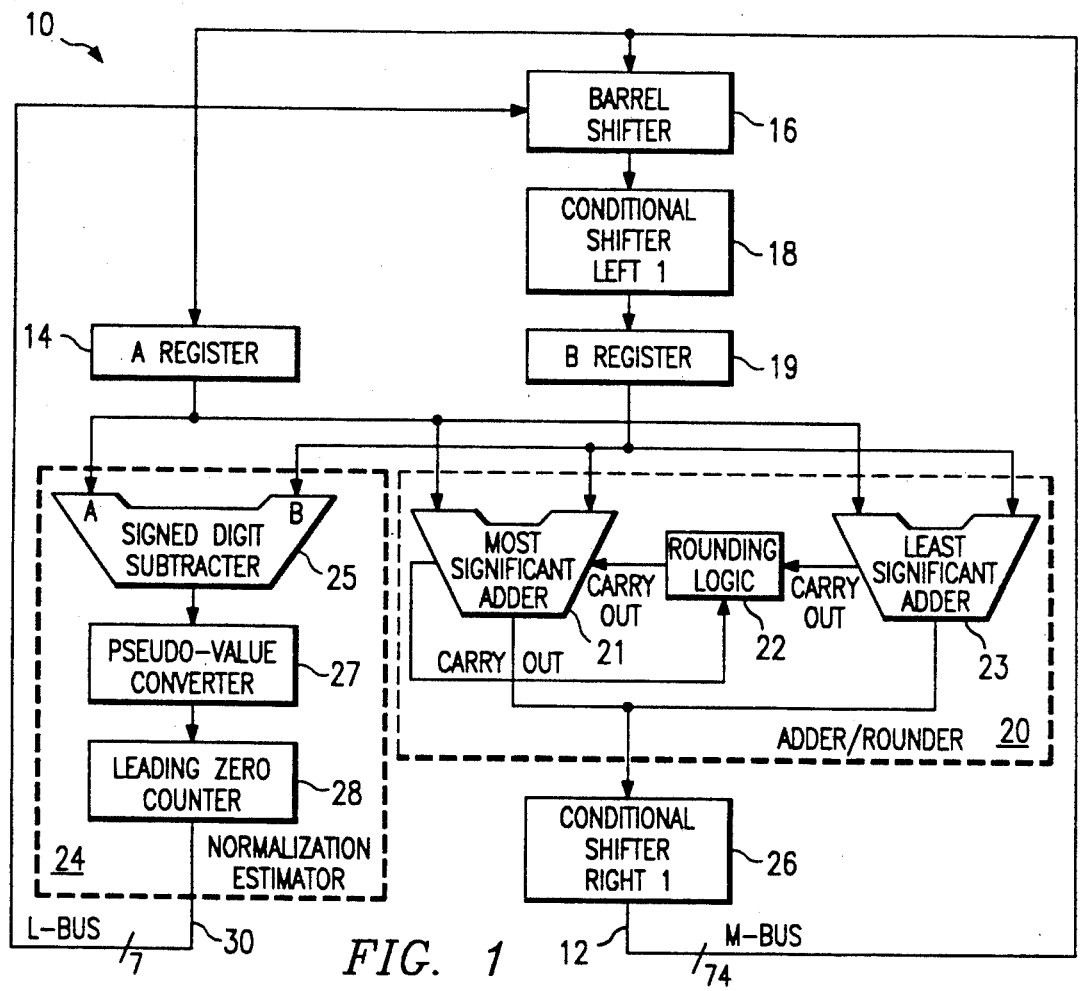

NORMALIZATION ESTIMATOR

RELATED APPLICATIONS

This application is a divisional of application Ser. No. 07/388,659, filed Aug. 2, 1989 and entitled "Normalization Estimator", now U.S. Pat. No. 5,040,138, issued on Aug. 13, 1991.

TECHNICAL FIELD OF THE INVENTION

This invention relates in general to digital electronic circuits, and more particularly, to a method and apparatus for performing mathematical operations using a normalization estimation circuit.

BACKGROUND OF THE INVENTION

Traditionally, performing a floating point mathematical operation and normalizing the result is a slow and tedious process. After computational circuitry performs a floating point operation on two operands, the result must be normalized so as to contain a "one" in the most significant bit (MSB) of the mantissa. A leading zero counter (LZC) or one detector is often used to count the number of leading zeroes in the mantissa. The floating point result is normalized by shifting the mantissa the number of bits indicated by the LZC. The result must also be converted to a signed magnitude form and rounded to ensure sufficient accuracy and precision. Typically, the steps of converting and rounding require two separate passes through an adder circuit.

Both computation and normalization steps are time consuming. The computation step is delayed due to the carry propagation of data during the floating point operation. In prior art systems, the normalization process cannot begin until after the floating point operation is complete. Current arithmetic systems are thus inherently slow since the computation and normalization steps must be performed sequentially.

Therefore, a need has arisen for an apparatus and method for increasing the speed of an arithmetic system by allowing normalization and computational functions to occur simultaneously.

SUMMARY OF THE INVENTION

In accordance with the present invention, an arithmetic circuit is provided which includes computation and normalization estimation circuitry. The normalization estimation circuitry has, as its inputs, the operands which are input into the computation circuitry. The normalization estimation circuitry does not require the result of the arithmetic operation as an input and may, therefore, operate in parallel with the computation circuitry to generate an approximation of the number of leading zeroes in the result which can then be input into a shifter concurrently with the result of the computation to approximately normalize the result.

According to one embodiment of the present invention, the normalization estimation circuitry comprises a signed digit subtracter, a pseudovalue converter and a leading zero counter. The signed digit subtracter subtracts the operands to yield a result in signed digit format. The pseudovalue converter then searches this result to locate the approximate bit position of the most significant nonzero bit in the result of an arithmetic operation occurring simultaneously in the computation circuitry. The pseudovalue converter locates this bit position by locating predetermined three bit groups which indicate the approximate position. The pseudo-value converter then generates a number in nonredundant format which has its most significant nonzero bit located in the selected position. The pseudovalue is then input into a leading zero counter which counts the number of leading zeroes in the pseudovalue and outputs the count to a shifter which appropriately shifts the result of the arithmetic operation. A conditional shifter is used to remove the indeterminacy in the normalization approximation. Circuitry is also provided to perform a two's complement conversion and rounding operation simultaneously.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates, in block diagram form, various portions of exemplary arithmetic and normalization circuits which may advantageously utilize the teachings of the present invention; and FIG. 2 illustrates a table of 3-bit groups used by the present invention to identify the location of the most significant bit in the result of an arithmetic operation.

DETAILED DESCRIPTION OF INVENTION

The preferred embodiment of the present invention is best understood by referring to FIGS. 1-2 of the drawings.

FIG. 1 illustrates a block diagram of an exemplary arithmetic circuit 10 using the normalization estimation circuit of the present invention. Circuit 10 illustrates a portion of a mantissa arithmetic logic unit which may reside in, for example, an arithmetic coprocessor or a microprocessor. A mantissa bus [M-bus]12 is used by circuit 10 to communicate with other components (not shown) of an integrated arithmetic processing system. The M-bus 12 is coupled to an A-register 14 which is operable to store a mantissa of a first operand which may, for example, comprise a mantissa of a first floating point number. The M-bus 12 is also coupled to a barrel shifter 16 which is operable to shift numbers left and right by any desired number of bit positions.

The output of barrel shifter 16 is coupled to a conditional shifter 18. Conditional shifter 18 is operable to shift data one bit left depending on the state of the most significant bit of the number at its input. The output of conditional shifter 18 is coupled to a B-register 19 which is operable to store a second operand which may, for example, comprise a mantissa of a second floating point number. The output of B-register 19 is coupled to an adder/rounder circuit 20 and a normalization estimation circuit 24.

The adder/rounder circuit 20 of the preferred embodiment comprises a most significant adder 21, rounding logic 22 and a least significant adder 23. The least significant adder 23 is operable to add or subtract the least significant words of two floating point numbers and has a carry output coupled to the rounding logic 22 and an output coupled to the input of a conditional shifter 26. The rounding logic 22 is operable to round a floating point result and has a carry output coupled to the most significant adder 21. The most significant adder 21 is operable to add or subtract the most significant words of two floating point numbers and has a carry output coupled to the rounding logic 22 and an output coupled to the input of conditional shifter 26.

Adders 21 and 23 each have two inputs which are coupled in parallel to the outputs of the A-register 14 and B-register 19, respectively.

Conditional shifter 26 is operable to normalize floating point numbers after rounding procedures. The output of conditional shifter 26 is coupled to barrel shifter 16 and A-register 14 via M-bus 12. The output of A-register 14 is also coupled to the normalization estimation circuitry 24 and adder/rounder circuit 20. The normalization estimation circuitry 24 produces an estimate of the number of leading zeroes in a result of a floating point operation performed in adder/rounder circuit 20. The output of the normalization estimation circuitry 24 is coupled to barrel shifter 16 via L-bus 30.

The normalization estimation circuitry 24 of the preferred embodiment comprises a signed digit subtracter 25 whose inputs are coupled to the outputs of the A-register 14 and B-register 19, respectively. The output of the signed digit subtracter 25 is coupled to the input of a pseudovalue converter 27 whose output is coupled to the input of a leading zero counter 28. The signed digit subtracter 25 receives the mantissas stored in the A-register 14 and B-register 19 as inputs, performs a signed digit subtraction and outputs a signed digit result to the pseudovalue converter 27. The pseudovalue converter 27 is operable to convert the redundant signed digit result to a non-redundant format, and outputs a pseudovalue to the leading zero counter 28. The pseudovalue comprises a number which has its most significant one in a bit position which is within one bit position of the actual bit position of the most significant one of the result of the operation performed in adder 22. The leading zero counter 28 outputs a value indicating the number of leading zeroes in the pseudovalue to the barrel shifter 16.

It should be understood that circuit 10 is a block diagram of a mantissa arithmetic logic unit and processes only the mantissa or fractional portion of floating point numbers. The mantissa arithmetic logic unit may exist in a floating point unit or in a microprocessor arithmetic logic unit. Exponents are processed in an exponent arithmetic logic unit (not shown). The barrel shifter 16, the conditional shifter 18 and the conditional shifter 26 all have data paths (not shown) to the exponent arithmetic logic unit as the shifting operations performed by these elements affect the value of the exponents associated with the result of the arithmetic operation.

In operation of circuit 10, A-register 14 and B-register 19 each receive the mantissas of floating point operands via M-bus 12. The operand loaded into B-register 19 is loaded by passing it unchanged through barrel shifter 16 and conditional shifter 18. Through the operation of normalization estimator circuitry 24, circuit 10 performs an arithmetic operation on the two operands and simultaneously estimates the number of leading zeroes in the result of the arithmetic operation. The normalization estimation circuitry 24 performs this estimation process. In the embodiment shown in FIG. 1, normalization estimation circuitry comprises the signed digit subtracter 25, the pseudovalue converter 27 and the leading zero counter 28. However, normalization estimation circuitry 24 may comprise other embodiments comprising different elements to perform the same function.

The signed digit subtracter 25 performs a signed digit subtraction on the operands, and outputs a result in signed digit format. The pseudovalue converter 27 converts the signed digit result into a pseudovalue in nonredundant format having a number of leading zeroes identical to or one less than that of the true floating point result. The leading zero counter 28 counts the number of leading zeroes in the pseudovalue. This number is output to the barrel shifter 16 via L-bus 30. M-bus 12 is 74 bits wide to provide a more than sufficient number of bits in the data path to conform to the IEEE standard for extended precision. L-bus 30 is seven bits wide. The width of the L-bus 30 and the M-bus 12 are dependent on the precision of the embodiment shown in FIG. 1 and should not be construed to limit the scope of the present invention which is applicable to a variety of embodiments having different capabilities with regard to the precision of the operands and the result.

The operands stored in A-register 14 and B-register 19 are presented to adder/rounder circuit 20 for subtraction simultaneously with their presentation to the normalization estimator 24. It is important to note that one operand need not be in a normalized format. For example, the operand stored in B-register 19 may be shifted into a non-normalized format to allow for the exponents of the two operands to be equal. Adder/rounder circuit 20 then may perform, for example, the subtraction of the mantissas stored in registers 14 and 19. The result of this arithmetic operation may not be in a normalized format and is presented to the barrel shifter 16 through M-bus 12. The result is passed unchanged at this point through conditional shifter 26 and is used during subsequent rounding operations. The result output by adder/rounder circuit 20 may be in either two's complement format or signed magnitude format depending on the relative magnitudes of the operands.

The barrel shifter 16 receives the non-normalized floating point result off the M-bus 12 and the value generated by the normalization estimation circuitry indicating the number of leading zeroes in the pseudovalue off the L-bus 30. The barrel shifter 16 then shifts the result the indicated number of bit positions left to approximately normalize the result. Since the value generated by the normalization estimation circuitry may be one less than the actual value necessary to normalize the result, an additional shift of one bit position may or may not be necessary. The conditional shifter 18 shifts the result one place if the result output by the barrel shifter 16 is not already in a normalized form. This is done by testing the most significant bit in the result output by the barrel shifter 16. The barrel shifter 16, conditional shifter 18 and conditional shifter 26 are all coupled to the exponent arithmetic logic unit to increment or decrement the exponent depending on whether the mantissa was shifted left or right.

In prior art methods, the output of computational circuitry, such as adder/rounder circuit 20, could be in two's complement format if the operands are both in normalized form. In this case, according to prior art methods, an additional pass through an adder circuit is required to convert the result to a format which facilitates a count of the leading zeroes of the result. According to the present invention, the number of leading zeroes is estimated whether the result output by adder/rounder circuit 20 is in two's complement or signed magnitude format. A result in two's complement format may be shifted by the count output by normalization estimator 24 and then passed through adder/rounder circuit 20 to allow for conversion from two's complement format to signed magnitude format and rounding operations in a single pass through adder/rounder circuit 20.

After the arithmetic result is normalized, the result may be rounded to conform to the appropriate IEEE standard rounding procedures. The four rounding procedures include rounding to the nearest place, rounding up, rounding down and chopping towards zero. Rounding operations require a second pass through adder/rounder circuit 20 because for example, when rounding to the nearest place, one-half unit is added in the least significant place, or when rounding up one full unit is added in the least significant place and the result is truncated. In both of these cases, from the addition process, there may be a carry out from the most significant bit of the result. This carry out bit may create a non-normalized result. Therefore, conditional shifter 26 shifts the non-normalized result one place to the right to renormalize the result, if necessary, after the rounding operation. The exponent is then appropriately adjusted in the exponent arithmetic logic unit.

An important technical advantage of the adder/rounder circuit 20 is that it is capable of doing a two's complement conversion and a rounding operation simultaneously. This is implemented by rounding logic 22 comprising carry propagation logic which drives the least significant bit of the most significant adder 21. If the result is already in signed magnitude format then rounding is dictated by the guard, round, and indicator bits per IEEE standard 754; however if the result is in two's complement format the IEEE standard is implemented as described herein below.

Rounding operations and two's complement conversion are similar in that they both involve the addition of a 1 to a selected bit position. In two's complement conversion, the bit position is the least significant bit of the least significant adder 23 while rounding operations affect the least significant bit of the most significant adder 21. If the unrounded result is in two's complement format, then before rounding the operand must be complemented and a logic one added to the least significant bit of the least significant adder 23. The information to then correctly round is available in the guard bit, which comprises the most significant bit of the least significant adder 23, and the carry into the guard bit. Therefore, to do simultaneous rounding and two's complement conversion, all necessary information is located in the guard bit, the carry into the guard bit and the least significant bit of the most significant adder 21. Below is a truth table which describes conditions where the carry into the least significant bit of the most significant adder 21 is forced to a one. If the conditions of the truth table are not met then the carry into the least significant bit of the most significant adder 21 is simply the carry out of the guard bit, the result of which provides a correctly rounded signed magnitude result.

| ROUNDING MODE | LSB | GUARD | CARRY INTO GUARD |
|---|---|---|---|
| NEAREST | X | 1 | X |
| NEAREST | 1 | 0 | 1 |
| (−) INFINITY | X | X | X |

The above truth table may be implemented in rounding logic 22 to perform rounding operations on the result if the result is in two's complement format.

The result of the subtraction operation performed in the cycle prior to rounding indicates whether the result is in two's complement format by a logic level zero on the carry out of the most significant adder 21. This information is stored in a data latch in the rounding logic 22 and is then used on the subsequent round cycle to invert the data operand and add one to the least significant bit in the least significant adder 23.

The operation of the pseudovalue converter 27 of one embodiment of the present invention involves logic which examines the result output by the signed digit subtracter 25 for the location of particular 3 bit groups. Referring to FIG. 2, various states are shown for three sequential signed bits. The table shown in FIG. 2 is used by the pseudovalue converter to convert the signed digit subtraction result, which is in signed digit format, to the pseudovalue input into the leading zero counter 28. By doing a three-bit overlap scan of each bit in the signed digit subtraction result, the bit position of the most significant nonzero bit can be determined within one bit position. The criterion establishing the most significant bit is summarized in tabular form in FIG. 2.

The pseudovalue converter 27 searches the result output by the signed digit subtracte 25 for the three bit groups shown in FIG. 2. The pseudovalue converter 27 uses a three bit overlap scan of each bit in the signed digit subtraction result. The pseudovalue converter 27 then generates a pseudovalue which is in non-redundant format and which has its most significant nonzero bit in the same bit position as the center bit in the three bit pattern located using the aforementioned three bit overlap scan. This pseudovalue is then output to the leading zero counter 28 which counts the number of leading zeroes in the pseudovalue and outputs that number to the barrel shifter 16 via L-bus 30. As discussed previously, the number of leading zeroes in the pseudovalue will always be exactly the same or one less than the number of leading zeroes in the result of the arithmetic operation performed in adder/rounder circuit 20.

The parallel operation of the computational and normalization estimation circuitry allows for saving of multiple clock cycles. In prior art systems, leading zero count circuitry is placed in series with the adder or computational circuitry. Thus, the time period for an arithmetic floating point operation was equal to the time required for the arithmetic operation plus the time required for normalization and rounding operations. An important technical advantage of the present invention is that the parallel orientation of the computation and normalization circuitry allows for the computation process and normalization approximation process to occur simultaneously. The number of leading zeroes in the floating point result is estimated simultaneously with, rather than after, the arithmetic operation. There is no need for a carry propagation path in the normalization estimation circuitry which allows for the quick and efficient generation of the pseudovalue. This allows for the total calculation time to determine the leading zero count to be comparable to the calculation time of the result itself. The normalization estimation circuitry has, as its inputs, the operands themselves and, therefore, is totally independent of the computational circuitry and can be run in parallel, allowing the saving of multiple clock cycles.

Although the present invention has been described in detail, it should be understood that various changes, substitutions and alterations can be made herein without departing from the spirit and scope of the invention as defined by the appended claims.

What is claimed is:

1. A normalization circuit for normalizing a result of an arithmetic operation performed on a first and second operands by a computational circuit, comprising:
   a signed digit subtracter operable to subtract the first operand from the second operand, and output a difference;
   a pseudovalue converter having an input coupled to said output of said signed digit subtracter, said pseudovalue converter operable to convert said difference into pseudovalue; and
   a leading zero counter coupled to receive said pseudovalue and operable to count the number of leading zeroes in said pseudovalue.

2. The normalization circuit of claim 1 wherein said normalization circuit is coupled in parallel with said computational circuit.

3. The normalization circuit of claim 1 wherein said pseudovalue converter is operable to generate said pseudovalue such that said pseudovalue contains a number of leading zeroes equal to or one less than the number of leading zeroes in said result of said arithmetic operation.

4. The normalization circuit of claim 1 wherein said pseudovalue converter is operable to perform a three bit overlapped scan on said difference to identify predetermined three bit patterns indicative of the approximate location of the most significant nonzero bit in said result.

5. The normalization circuit of claim 1 wherein the arithmetic operation comprises subtraction.

6. The normalization circuit of claim 1 wherein one of the operands is selectively denormalized prior to performing the arithmetic operation such that exponents associated with the operands are equal.

7. A method of normalizing a result of an arithmetic operation of two floating point operands comprising the steps of:
   performing a signed digit subtraction on said floating point operands to yield a signed digit difference in a signed digit subtractor;
   transmitting signals associated with the signed digit difference to a pseudovalue converter;
   converting the signed digit difference to a non-redundant pseudovalue having a number of zeroes within a predetermined range of the number of zeroes in the result of the arithmetic operation in the pseudovalue converter; and
   counting the number of zeroes in the pseudovalue to yield an estimation of the number of leading zeroes in the results of the arithmetic operation in a leading zero counter.

8. The method of claim 7, and further comprising the step of:
   shifting the result of the arithmetic operation a number of bit positions equal to the estimation to yield an intermediate result.

9. The method of claim 8 and further comprising the step of conditionally shifting the intermediate result a single bit position responsive to the state of the most significant bit in the intermediate result to yield a normalized result.

10. The method of claim 7 wherein the arithmetic operation comprises subtraction.

11. The method of claim 7 wherein one of the operands is denormalized prior to performing the arithmetic operation such that exponents associated with the operands are equal.

* * * * *